United States Patent
Wu et al.

(10) Patent No.: US 10,114,267 B2
(45) Date of Patent: *Oct. 30, 2018

(54) DISPLAY DEVICE WITH WATER-PROOF GLUE

(71) Applicant: E Ink Holdings Inc., Hsinchu (TW)

(72) Inventors: Chi-Ming Wu, Hsinchu (TW); Ian French, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,404

(22) Filed: Aug. 9, 2017

(65) Prior Publication Data

US 2017/0336694 A1 Nov. 23, 2017

Related U.S. Application Data

(63) Continuation of application No. 14/987,771, filed on Jan. 5, 2016, now Pat. No. 9,759,979, which is a (Continued)

(30) Foreign Application Priority Data

Jul. 9, 2012 (TW) .............................. 101124647 A

(51) Int. Cl.
| | | |
|---|---|---|
| *G02B 26/00* | (2006.01) | |
| *G02F 1/167* | (2006.01) | |
| *G02B 1/18* | (2015.01) | |
| *G02B 1/14* | (2015.01) | |
| *G02F 1/1333* | (2006.01) | |

(52) U.S. Cl.
CPC .............. *G02F 1/167* (2013.01); *G02B 1/14* (2015.01); *G02B 1/18* (2015.01); *G02F 1/133308* (2013.01); *G02F 1/133305* (2013.01); *G02F 2001/13332* (2013.01); *G02F 2001/133311* (2013.01); *G02F 2001/133331* (2013.01);
(Continued)

(58) Field of Classification Search
CPC ............ G02F 1/167; G02F 2001/1678; G02F 2001/1672; G02F 2001/1676; G09G 3/344
See application file for complete search history.

(56) References Cited

U.S. PATENT DOCUMENTS

| 6,844,958 B2 | 1/2005 | Kawai |
|---|---|---|
| 7,662,456 B2 | 2/2010 | Bell |

(Continued)

FOREIGN PATENT DOCUMENTS

| CN | 101277594 A | 10/2008 |
|---|---|---|
| CN | 101419375 A | 4/2009 |

(Continued)

*Primary Examiner* — William R Alexander
*Assistant Examiner* — Tamara Y Washington
(74) *Attorney, Agent, or Firm* — CKC & Partners Co., Ltd.

(57) ABSTRACT

A display device includes a cover plate, a display, a frame, a flexible circuit board and a water-proof glue. The display is disposed on the cover plate. The frame is disposed on a periphery area of the cover plate and surrounds the display to form a trench. The flexible circuit board includes a first portion and a second portion. The first portion is attached to the front surface of the active array substrate, and the second portion is fastened to the cover plate in the trench. The water-proof glue fills the trench.

20 Claims, 4 Drawing Sheets

Related U.S. Application Data continuation-in-part of application No. 13/661,323, filed on Oct. 26, 2012.

(60) Provisional application No. 61/595,698, filed on Feb. 7, 2012.

(52) U.S. Cl.
CPC .... *G02F 2201/50* (2013.01); *G02F 2201/503* (2013.01); *G02F 2202/28* (2013.01)

(56) References Cited

U.S. PATENT DOCUMENTS

| | | |
|---|---|---|
| 7,687,806 B2 | 3/2010 | Hsu et al. |
| 7,898,726 B2 | 3/2011 | Ito et al. |
| 7,974,660 B2 | 7/2011 | Hsu et al. |
| 8,248,686 B2 | 8/2012 | Kwon et al. |
| 8,503,065 B2* | 8/2013 | Hsieh ............ G02F 1/167 345/107 |
| 9,465,206 B1* | 10/2016 | Thijssen ........ G02B 26/005 |
| 2006/0291034 A1 | 12/2006 | Patry et al. |
| 2009/0109520 A1 | 4/2009 | Park et al. |
| 2010/0134871 A1 | 6/2010 | Wang |
| 2010/0182290 A1 | 7/2010 | Matsuoka et al. |
| 2010/0202076 A1 | 8/2010 | Liu |
| 2011/0261032 A1 | 10/2011 | Terashima et al. |
| 2011/0292492 A1 | 12/2011 | Hsieh et al. |
| 2012/0013970 A1 | 1/2012 | Shin et al. |
| 2013/0201548 A1* | 8/2013 | Wu ............... G02F 1/167 359/296 |

FOREIGN PATENT DOCUMENTS

| | | |
|---|---|---|
| CN | 101794050 A | 8/2010 |
| JP | 2003029644 A | 1/2003 |
| JP | 2004004277 A | 1/2004 |
| JP | 2007241019 A | 9/2007 |
| TW | 200844621 A | 11/2008 |

* cited by examiner

DISPLAY DEVICE WITH WATER-PROOF GLUE

CROSS-REFERENCE TO RELATED APPLICATION

The present application is continuation of U.S. application Ser. No. 14/987,771, filled Jan. 5, 2016. The aforementioned patent application Ser. No. 14/987,771 is a continuation in part of U.S. application Ser. No. 13/661,323, filed Oct. 26, 2012, which claims the priority benefit of U.S. Provisional Application Ser. No. 61/595,698, filed Feb. 7, 2012, and Taiwan Application Serial Number 101124647, filed Jul. 9, 2012, the contents of each of which are herein incorporated by reference in their entirety.

BACKGROUND

Technical Field

The disclosure relates to a display device, and more particularly, to an electronic-ink display device.

Description of Related Art

E-paper is a display technology having advantages of paper-like, ultra-thin, lightweight, bendable, and low power consumption. The research of E-paper is mainly focused on electrophoretic display technology and cholesteric liquid crystal display technology. The most widely used technology is electrophoretic display technology. In 2009, more than 90% of E-paper adopt the electrophoretic display technology.

The display surface of the E-paper display device (or called as electronic-ink display device) is usually protected by a layer of soft plastic material. However, since the hardness of the plastic material is not enough to protect the E-paper display device, the E-paper display device could be easily damaged by surface impact. Furthermore, if tempered glass is used to protect E-paper display device, the E-paper display device will be thick and heavy.

SUMMARY

Accordingly, in one aspect, the present disclosure is directed to a display device, such as for example an electronic-ink display device, with better protection and lightweight.

The display device includes a cover plate, an electronic-ink display, a frame, a flexible circuit board and a water-proof glue. The electronic-ink display is disposed on the cover plate. The frame is disposed on a peripheral area of the cover plate, and surrounds the electronic-ink display to form a trench. The flexible circuit board includes a first portion and a second portion. The first portion is attached to the front surface of the active array substrate, and the second portion is fastened to the cover plate in the trench. The water-proof glue fills the circular trench.

The foregoing presents a simplified summary of the disclosure in order to provide a basic understanding to the reader. This summary is not an extensive overview of the disclosure and it does not identify key critical elements of the present disclosure or delineate the scope of the present disclosure. Its sole purpose is to present some concepts disclosed herein in a simplified form as a prelude to the more detailed description that is presented later. Many of the attendant features will be more readily appreciated as the same becomes better understood by reference to the following detailed description considered in connection with the accompanying drawings.

DETAILED DESCRIPTION

Figure 1:
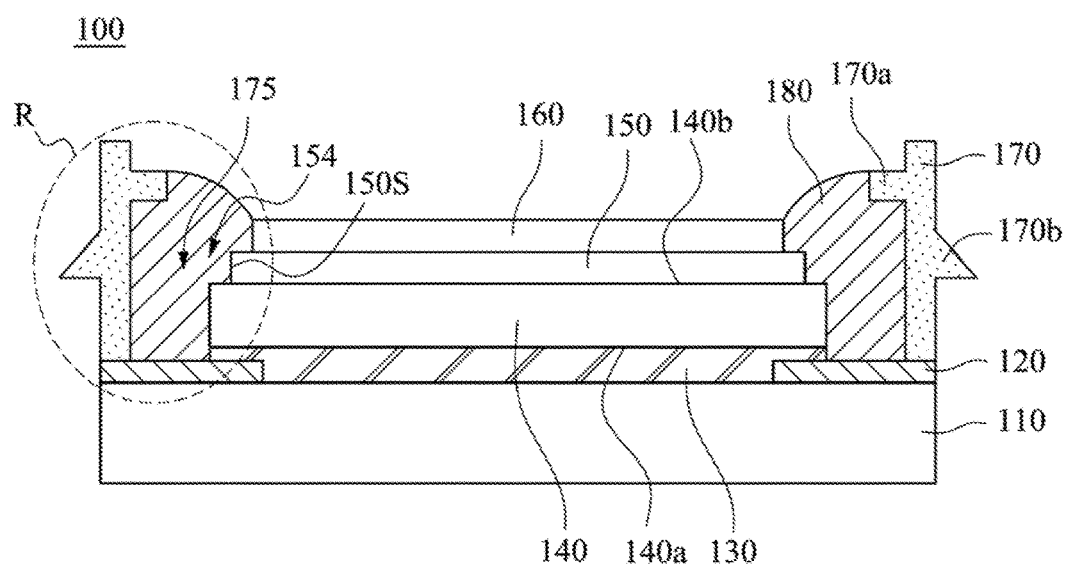
FIG. 1 is a cross-sectional diagram of an electronic-ink display device according to an embodiment of this disclosure.

Accordingly, an electronic-ink display device is provided. A cover plate covers the display surface of the electronic-ink display device. Therefore, the electronic-ink display device can get a better protection to resist an impact by an external force.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a cross-sectional diagram of an electronic-ink display device according to an embodiment of this disclosure. In FIG. 1, an electronic-ink display device 100 includes a cover plate 110, a printed frame 120, a transparent glue layer 130, an electronic-ink display 140, a first protection layer 150, a second protection layer 160, a frame 170 and a water-proof glue 180.

The electronic-ink display 140 is positioned on the cover plate 110. The printed frame 120 is located on a peripheral area of the cover plate 110, and disposed between the electronic-ink display 140 and the cover plate 110, to define a central display area as a display window. The transparent glue 130 is disposed between the electronic-ink display 140 and the cover plate 110 to adhere the electronic-ink display 140 to the cover plate 110.

The frame 170 is disposed on the peripheral area of the cover plate 110, and surrounds the electronic-ink display 140 to form a circular trench 175 between the electronic-ink display 140 and the cover plate 110 and the frame 170. The water-proof glue 180 fills the circular trench 175. Moreover, the first protection layer 150 is disposed on the electronic-ink display 140 to make the water-proof glue 180 fill between the first protection layer 150 and the frame 170. In this embodiment, the first protection layer 150 can prevent moisture from invading the electronic-ink display 140 from the backside and thus damage the electronic-ink display 140.

When the thickness of the first protection layer 150 is too thin (about 0.2 mm) to block off the waterproof glue 180, the waterproof glue 180 may overflow from the circular trench 175. Then, a second protection layer 160 (about 0.2-0.4 mm thick) can be optionally attached on the first protection layer 150 to keep the waterproof glue 180 stay between the second protection layer 160 and the frame 170. When the thickness of the first protection layer 150 is thick enough (about 0.4 mm) to block off the waterproof glue 180, the second protection layer 160 is not needed. Furthermore, since the function of the second protection layer 160 is prevention of the overflow of the waterproof glue 180, the structure of the second protection layer 160 can be a circular structure positioned on the peripheral area of the first protection layer 150.

For more easily injecting the waterproof glue 180 and increasing the length of the moisture infiltration path, the lateral shape of the stack formed by stacking the electronic-ink display 140, the first protection layer 150, and the second protection layer 160 is a ladder shape to increase the width of the injection port. That is, the area of the electronic-ink display 140 is larger, the area of the second protection layer 160 is smaller, and the area of the first protection layer 150 is between the electronic-ink display 140 and the second protection layer 160. However, if the injection port of the waterproof glue 180 is large enough, such as the width of the injection port is larger than 2 mm, the area of the second protection layer 160 doesn't need to be smaller than the area of the first protection layer 150. The area of the second protection layer 160 can be larger than the area of the first protection layer 150. This disclosure is not limited thereto.

Figure 3:
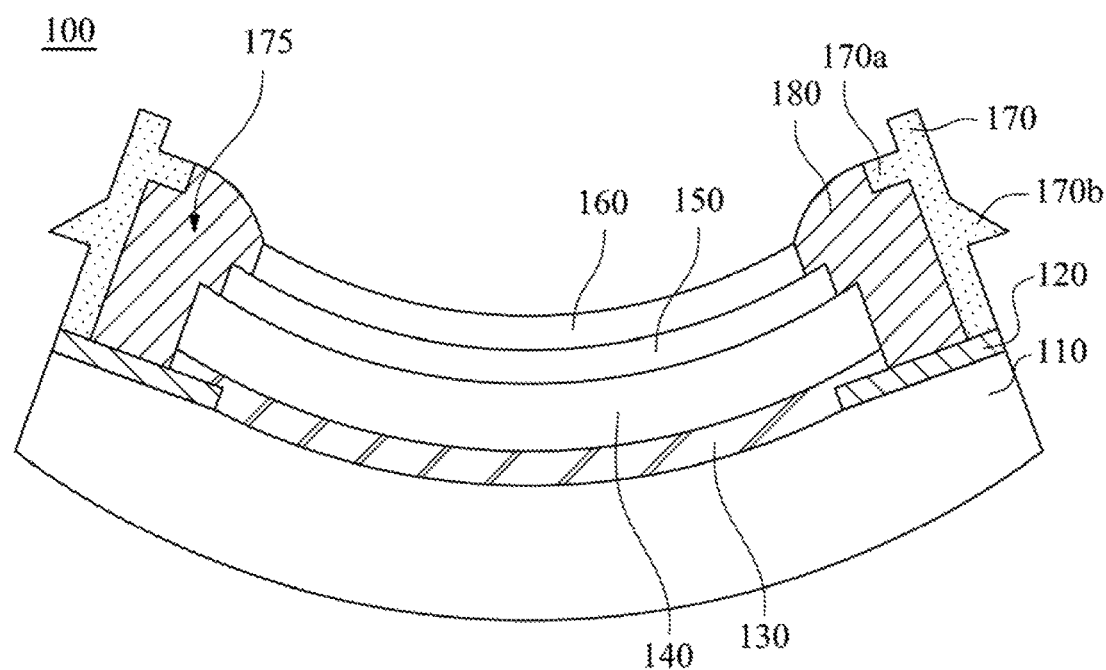
FIG. 3 is a cross-sectional diagram of an electronic-ink display device according to another embodiment of this disclosure.

The cover plate 110 can be planar or curved. In one embodiment, the cover plate 110 has a curvature, as shown in FIG. 3. The shape of the cover plate 110 is determined by the requirement of the final product. The material of the cover plate 110 can be glass, quartz, or a plastic material with greater hardness, for example. The plastic material above can be polymethylmethacrylate (PMMA), for example.

The material of the transparent glue 130 can be optically clear adhesive (OCA) or transparent water glue to facilitate displaying clear picture by the electronic-ink display device 100.

Figure 2:
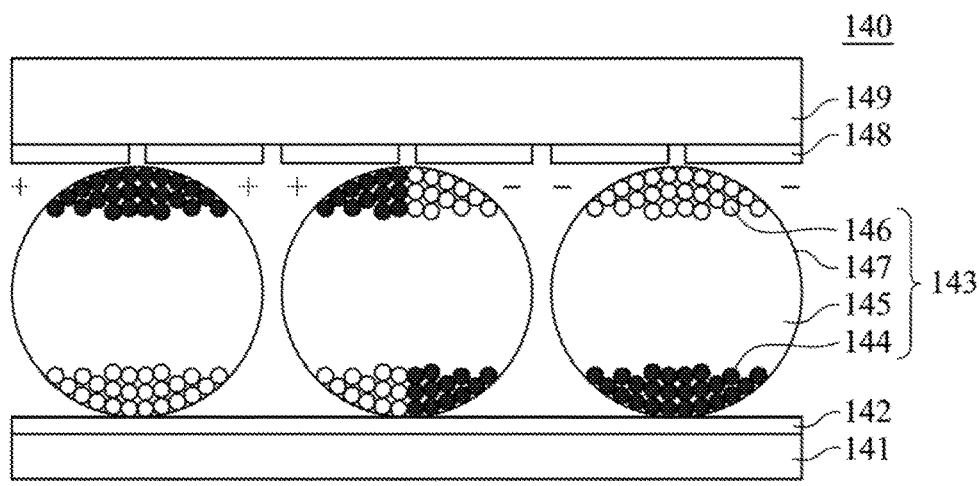
FIG. 2 is a cross-sectional diagram of an electronic-ink display in FIG. 1.

The detailed structure of the electronic-ink display 140 is shown in FIG. 2, and FIG. 2 is a cross-sectional diagram of an electronic-ink display in FIG. 1. In FIG. 2, the electronic-ink display 140 sequentially includes, from bottom to top, a first transparent substrate 141, a common electrode layer 142, a second transparent glue layer (nor shown in FIG. 2), an electronic ink layer 143, a second transparent glue layer (not shown in FIG. 2), a thin film transistor array layer 148, and a second transparent substrate 149. In other embodiments, the first transparent substrate 141 can be omitted. That is, the common electrode layer 142 can be directly disposed on the cover plate 110 to make the final electronic-ink display device 100 to be lighter and thinner.

The electronic ink layer 143 can be composed of microcapsules 147 having negative-charged pigment 144, transparent liquid 145, and positive-charged pigment 146. The electronic ink layer 143 also can be other available electronic ink display technologies. In FIG. 2, since each pixel of the thin film transistor array layer 148 has several electrodes, the distribution of the negative-charged pigment 144 and the positive-charged pigment 146 can be adjusted by the area percentage occupied by the positive and negative electrodes to achieve the goal of displaying various pictures.

The material of the first protection layer 150 and the second protection layer 160 can be polyethylene terephthalate (PET), polyethylene naphthalate (PEN), polycarbonate (PC), PMMA, or glass, for example.

According to another embodiment, the frame 170 can further has at least a first positioning part 170a extending above the circular trench 175 for controlling the height of the filling water-proof glue 180. The first positioning part 170a can be a protrusion part (as shown in FIG. 1) or a recession part. Therefore, the height of the upper surface of the water-proof glue 180 is about the same as the height of the first positioning part 170a.

According to yet another embodiment, the frame 170 can further has at least a second positioning part 170b extending toward an outside direction of the frame 170. The second positioning part 170b is used to assemble a peripheral component to form a final product. The peripheral component can be an outer frame for the final product, for example.

In light of the foregoing, since the display surface of the electronic-ink display device is covered by a lighter cover plate, a layer of glass can be omitted to decrease the weight and the thickness. Therefore, the provided electronic-ink display device above is lighter and thinner. At the same time, the electronic-ink display device can obtain a better protection from the cover plate to resist a greater external impact. Moreover, since the shape of the cover plate can be planar or curved, the design of the final electronic-ink display device can be varied to fulfill the requirements of various products.

Referring back to FIG. 1, according to some embodiments of the present disclosure, the electronic-ink display 140 has a back surface 140b and a front surface 140a capable of displaying an image. The front surface 140a is adjacent to the cover plate 110. The first protection layer 150 is disposed on the back surface 140b of the electronic-ink display 140. The area of the first protection layer 150 is less than the area of the back surface 140b of the electronic-ink so that a sidewall 150s of the first protection layer 150 and a portion of the back surface 140b of the electronic-ink display 140 constitute a step structure 154. The frame 170 is disposed on a peripheral area of the cover plate 110 and surrounds the electronic-ink display 140. The trench 175 is formed between the frame 170 and the electronic-ink display 140. The first positioning part 170a of the frame 170 extends from the inner sidewall of the frame 170 towards the trench 175, and the first positioning part 170a is at a position over the step structure 154. The water-proof glue 180 is filled in the trench 175 and covers the step structure 154, and the water-proof glue 180 is in contact with the frame 170.

The step structure 154 favorably increases the contact area between the water-proof glue 180, the electronic-ink display 140 and the first protection layer 150 so that the adhesive force there between is increased. Accordingly, the step structure 154 contributes to restrain moisture from penetrating to the electronic-ink display 140 through the backside of the electronic-ink display device 100 as the adhesion between the water-proof glue 180, the electronic-ink display 140 and the first protection layer 150 is improved.

In addition, the second positioning part 170b of the frame 170 may be used to engage with a peripheral component to form a final product. More significantly, the first positioning part 170a of the frame 170 is configured to control the height or amount of the water-proof glue 180 filled in the trench 175, and therefore the first positioning part 170a advantageously contributes to the stability of the process of filling the water-proof glue 180.

According to yet some embodiments, the edge portion R of the electronic-ink display device shown in FIG. 1 has a number of variations.

Figure 4:
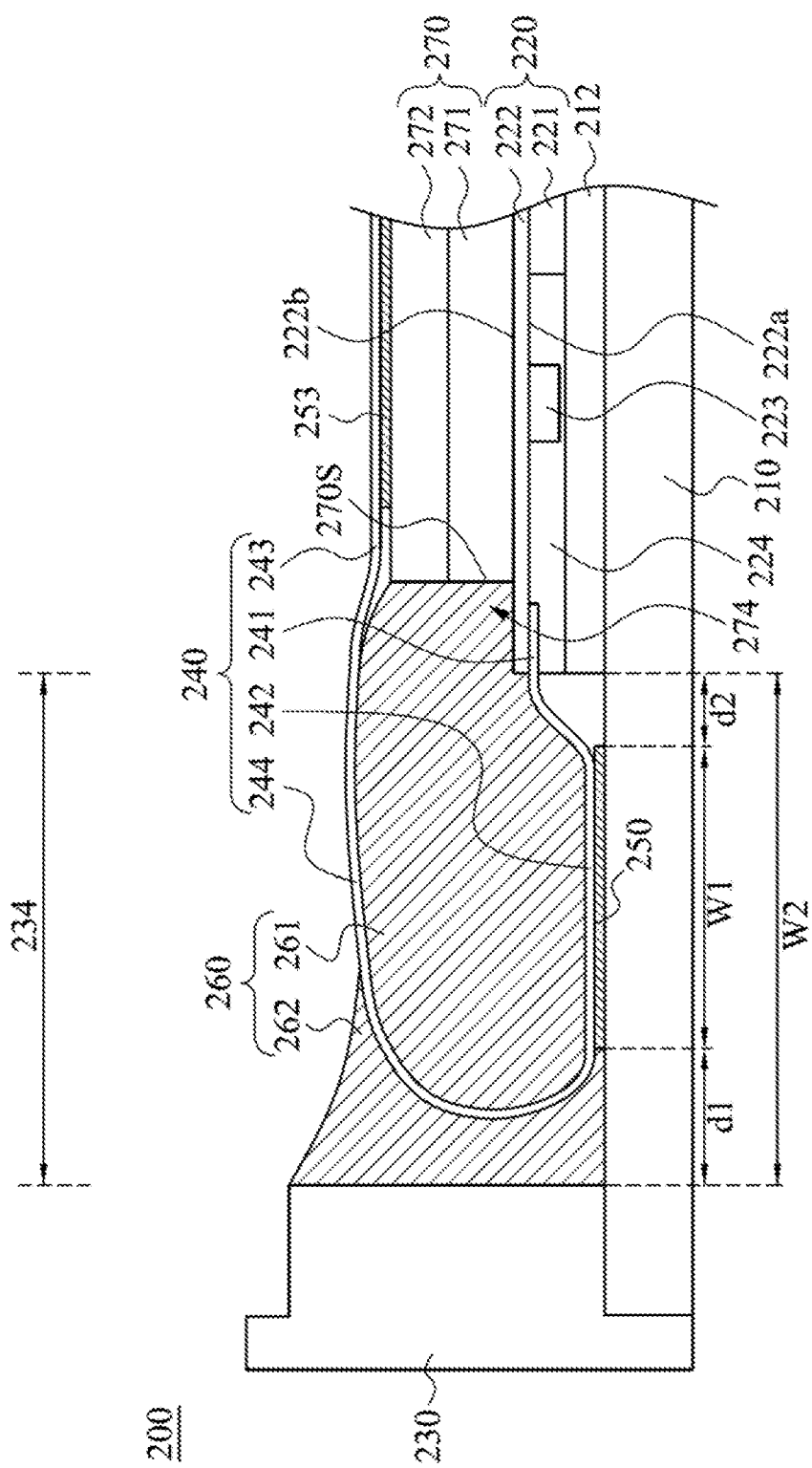
FIG. 4 is a cross-sectional diagram of an electronic-ink display device according to some embodiments of the present disclosure.

FIG. 4 is a cress-sectional view schematically illustrating an edge portion of an electronic-ink display device 200 according to yet some embodiments of the present disclosure. The electronic-ink display device 200 includes a cover plate 210, an electronic-ink display 220, a frame 230, a flexible circuit board 240 and a water-proof glue 260.

The cover plate 210 functions as a carrier on which the electronic-ink display 220, the frame 230 and the flexible circuit board 240 are disposed. The cover plate 210 is transparent so that the displayed image of the electronic-ink display 220 may be observed through the cover plate 210. The cover plate 210 further serves as a protective substrate to protect the electronic-ink display 220 from damage caused by an external impact.

The electronic-ink display 220 is disposed on the cover plate 210, and includes an active array substrate 222 and an electronic-ink layer 221. The active array substrate 222 has a front surface 222a adjacent to the cover plate 210 and a back surface 222b opposite to the front surface 222a. The electronic-ink layer 221 is disposed on or attached to the front surface 222a of the active array substrate 222. The active array substrate 222 includes a flexible substrate on which active elements are formed. In some embodiments, the area of the electronic-ink layer 221 is less than that of the active array substrate 222, and a periphery region of the front surface 222a is free of the electronic-ink layer 221. In some examples, the electronic-ink display 220 further includes a driving chip 223 disposed on the periphery region of the front surface 222a. In yet some examples, the electronic-ink display 220 further includes a glue layer 224 formed on the periphery region of the front surface 222a. In some embodiments, the electronic-ink display 220 is fastened to the cover plate 210 by an optical clear adhesive (OCA) 212, and the glue layer 224 fills the space between the OCA 212 and the active array substrate 222. In some embodiments, the electronic-ink display 220 may includes any feature described above in connection with the electronic-ink display 140 shown in FIG. 2.

The frame 230 is disposed on a peripheral area of the cover plate 210, and the frame 230 further surrounds the electronic-ink display 220 so to form a trench 234 between the frame 230 and the electronic-ink display 220. The frame 230 may includes any feature described above in connection with the frame 170 shown in FIG. 1.

The flexible circuit board 240 includes a first portion 241 and a second portion 242 respectively attached to the active array substrate 222 and the cover plate 210. The flexible circuit board 240 has a number of conductive lines therein for transmitting electrical signals.

The first portion 241 is attached to the front surface 222a of the active array substrate 222. The first portion 241 of the flexible circuit board 240 is connected to the circuits or pads formed on the active array substrate 222 so that driving signals may be transmitted to the active array substrate 222 through the flexible circuit board 240. In some examples, the glue layer 224 covers the first portion 241 of the flexible circuit board 240. The thickness of the glue layer 224 is substantially equal to the thickness of the electronic-ink layer 221.

It is noted that the second portion 242 of the flexible circuit board 240 is fastened to the cover plate 210 in the trench 234. As shown in FIG. 4, the flexible circuit board 240 extends from the periphery region of the active array substrate 222 and turns round. When assembling such flexible circuit board 240, if the flexible circuit board 240 is provided with only a single fixed portion (i.e., the first portion 241), the first portion 241 of the flexible circuit board 240 is probably detached or separated from the active array substrate 222. In addition, the conductive lines in the flexible circuit board 240 are probably damaged before the entire flexible circuit board 240 is fixed. Particularly, before the water-proof glue 260 is filled, a large part of the flexible circuit board 240 may be moveable, and such movement probably damages the conductive lines in the flexible circuit board 240 and/or the junction between the first portion 241 and the active array substrate 222. The issues mentioned above may be resolved by designing the second portion 242 of the flexible circuit board 240 being fastened to the cover plate 210. Therefore, according to some embodiments, the present disclosure at least relies on the feature that the flexible circuit board 240 has at least a portion fastened to the cover plate 210 in the trench 234.

A fastener 250 may optionally be provided on the cover plate 210 according to some embodiments of the present disclosure. In examples, the fastener 250 is positioned in the trench 234, and the fastener 250 fastens the second portion 242 of the flexible circuit board 240 to the cover plate 210. For example, the fastener 250 may be a flat fastener such as a double side tape (DST) or an adhesive layer, or the likes, or other suitable elements providing the same function.

When the fastener 250 is a flat fastener, the dimension of the flat fastener 250 is relevant to the manufacturing yield according to some embodiments of the present disclosure. In some examples, the flat fastener 250 and the trench 234 respectively have a first width W1 and a second width W2. The ratio of the first width W1 to the second width W2 is about 0.4 to about 0.8, specifically about 0.5 to about 0.7, more specifically about 0.55 to about 0.65. It has been observed that the ratio the first width W1 to the second width W2 is related to the manufacturing yield according to some embodiments of the present disclosure. When the ratio of the first width W1 to the second width W2 is ranged from about 0.4 to about 0.8, a relatively high manufacturing yield may be obtained. The dimension of the flat fastener 250 dominates not only the adhesion between the second portion 242 and the cover plate 210, but also the width of the second portion 242. Significantly, the width of the second portion 242 dominates the maximum curvature of the flexible circuit board 240. Without being bonded to any theory, it is believed that a large curvature of the flexible circuit board 240 implies the flexible circuit board 240 suffering a high bending stress, and the bending stress is related to the manufacturing yield. Accordingly, the dimension of the flat fastener 250 affects the yield according to some embodiments of the present disclosure. In the present disclosure, the fastener 250 is not limited to the flat fastener because other types of fasteners may be applied to the embodiments disclosed herein.

The position of the fastener 250 is a factor relevant to the manufacturing yield as well according to some embodiments of the present disclosure. In some examples, the fastener 250 has an edge spaced apart from the frame 230 by a distance d1. The ratio of the distance d1 to the second width W2 is about 0.1 to about 0.4, specifically about 0.2 to about 0.4, more specifically about 0.25 to about 0.35. In some examples, the fastener 250 has another edge spaced apart from the electronic-ink display 220 by a distance d2. The ratio of the distance d2 to the second width W2 is about 0.03 to about 0.3, specifically about 0.05 to about 0.2, more specifically about 0.05 to about 0.15. The distance d1 and d2 dominate the dimension of the second portion 242. When the ratios of d1/W2 and d2/W2 are in the ranges described above (i.e., 0.1-0.4 and 0.03-0.3), a relatively high manufacturing yield may be obtained. In yet some examples, a plurality of fasteners may be provided, and the fasteners are deposed to fasten opposite sides of the second portion 242.

The electronic-ink display device 200 may further includes a protection layer 270 attached to the back surface 222b of the active array substrate 222 according to some embodiments of the present disclosure. The length of the protection layer 270 is less than the length of the active array substrate 222 such that a step 274 is constituted by a sidewall 270S of the protection layer 270 and a portion of the back surface 222b of the active array substrate 222. In some examples, the protection layer 270 includes a first protection layer 271 and a second protection layer 272 stacked thereon. The first and the second protection layers 271, 272 may include the same material as the first and second protection layers 150, 160 described hereinbefore. In yet some examples, the first protection layer 271 includes a water-proof layer to restrain moisture from penetrating the protection layer 271. The second protection layer 272 is configured to increase the total thickness of the protection layer 270, such that the thickness of the water-proof glue 260 is desirably increased.

In some embodiments, the flexible circuit board 240 may optionally include a third portion 243 and a turning portion 244. The turning portion 244 extends from the second portion 242, and turns round to interconnect the third portion 243 with the second portion 242. The third portion 243 of the flexible circuit board 240 is located on or over the protection layer 270. In one example, a flat fastener 253 is used to fasten the third portion 243 of the flexible circuit board 240 to the top surface of the protection layer 270.

The water-proof glue 260 is filled in the trench 234. In some embodiments, as shown in FIG. 4, the water-proof glue 260 includes an inner portion 261 and an outer portion 262, and the inner portion 261 and the outer portion 262 are separated by the turning portion 244 of the flexible circuit board 240. The approach of forming the water-proof glue 260, according to some embodiments of the present disclosure, is briefly described below. Before the third portion 243 of the flexible circuit board 240 is attached onto the protection layer 270, glue for forming the inner portion 261 is injected firstly. Thereafter, the third portion 243 of the flexible circuit board 240 is attached onto the protection layer 270, and then glue for forming the outer portion 262 is injected into the trench 234. Then, a curing process such as for example a heating process is performed to cure the injected glue, thereby forming the inner portion 261 and the outer portion 262 of the water-proof glue 260. The outer portion 262 is located between the frame 230 and the turning portion 244 of the flexible circuit board 240, whereas the inner portion 261 is located between turning portion 244 and the electronic-ink display 220. In these embodiments, the opposite sides of the turning portion 244 are supported by the water-proof glue 260, and the water-proof glue 260 therefore secures the flexible circuit board 240 from damage in a reliability test. In yet some embodiments, the water-proof glue 260 may include any feature described hereinbefore in connection with the waterproof glue 180.

Figure 5:
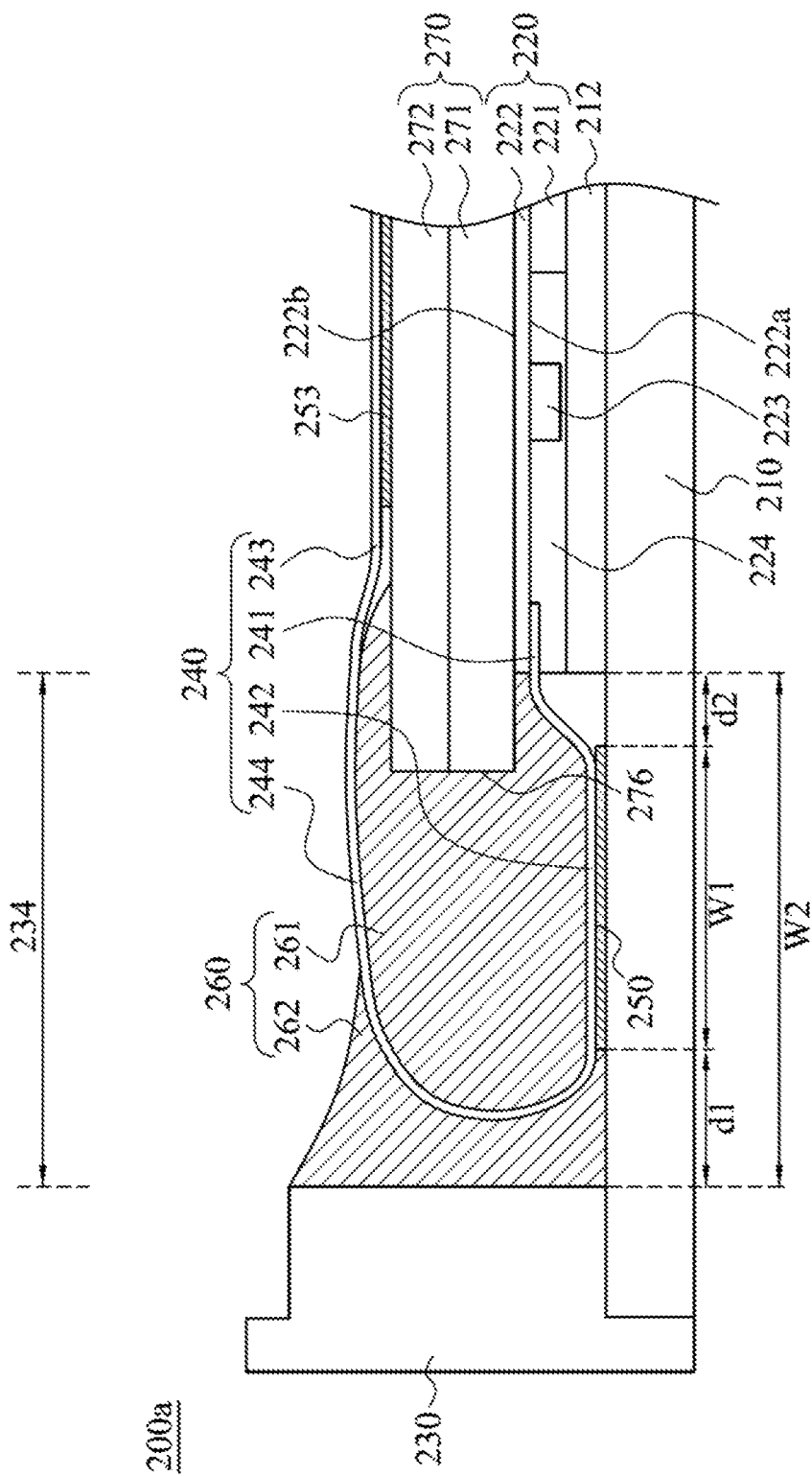
FIG. 5 is a cross-sectional diagram of an electronic-ink display device according to some embodiments of the present disclosure.

FIG. 5 is a cress-sectional view schematically illustrating an edge portion of an electronic-ink display device 200a according to yet some embodiments of the present disclosure. In FIG. 5, the same or similar features are identified by the same reference numerals. These features are the same as or similar to like-numbered features described with respect to FIG. 4. Therefore, the description will be omitted to avoid repetition.

The electronic-ink display device 200a is characterized in that the length of the protection layer 270 is greater than the length of the active array substrate 222, so that an edge portion 276 of the protection layer 270 extends past an edge of the active array substrate 222. Accordingly, the protection layer 270 overlaps the first portion 241 of the flexible circuit board 240 when viewed in a direction perpendicular to the cover plate 210. In some examples, the edge portion 276 of the protection layer 270 further extends to overlap the second portion 242, which is attached to the cover plate 210. The edge portion 276 advantageously presents the first portion 241 of the flexible circuit board 240 from detaching from the active array substrate 222 when assembly the flexible circuit board 240.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A display device, comprising:
   a cover plate;
   a display disposed on the cover plate, the display comprising an active array substrate having a front surface adjacent to the cover plate and a back surface opposite to the front surface;
   a frame disposed on a peripheral area of the cover plate and surrounding the display to form a trench between the frame and the display;
   a flexible circuit board comprising a first portion and a second portion, wherein the first portion is attached to the front surface of the active array substrate, and the second portion is fastened to the cover plate in the trench; and
   a water-proof glue filling the trench.

2. The display device of claim 1, further comprising a protection layer attached to the back surface of the active array substrate, wherein the protection layer has a length less than a length of the active array substrate such that a sidewall of the protection layer and the back surface of the active array substrate constitute a step.

3. The display device of claim 2, wherein the flexible circuit board further comprises a third portion located over the protection layer.

4. The display device of claim 3, wherein the flexible circuit board further comprises a turning portion positioned in the trench, and the turning portion interconnects the second portion with the third portion.

5. The display device of claim 1, wherein the flexible circuit further comprises a turning portion positioned in the trench and extending from the second portion, wherein the water-proof glue comprises an inner portion and an outer portion, and the inner portion and the outer portion are separated by the turning portion of the flexible circuit.

6. The display device of claim 1, further comprising a protection layer attached to the back surface of the active array substrate, wherein the protection layer has a length greater than a length of the active array substrate, and has an edge extending past an edge of the active array substrate.

7. The display device of claim 1, wherein the display further comprises:
   an electronic-ink layer on the front surface of the active array substrate, wherein a periphery region of the front surface is free of the electronic-ink layer;
   a driving chip on the periphery region of the front surface; and
   a glue covering the first portion of the flexible circuit board.

8. The display device of claim 1, further comprising a flat fastener positioned in the trench and configured to fasten the second portion to the cover plate, wherein the flat fastener and the trench respectively have a first width and a second width, and a ratio of the first width to the second width is about 0.4 to about 0.8.

9. The display device of claim 1, further comprising a fastener positioned in the trench and configured to fasten the second portion to the cover plate, wherein the fastener has an edge spaced apart from the frame by a distance, and a ratio of the distance to the second width is about 0.1 to about 0.4.

10. The display device of claim 1, further comprising a fastener positioned in the trench and configured to fasten the second portion to the cover plate, wherein the fastener has an edge spaced apart from the display by a distance, and a ratio of the distance to the second width is about 0.03 to about 0.3.

11. A display device, comprising:
a cover plate;
a display disposed on the cover plate and having a back surface and a front surface for displaying an image, wherein the front surface is adjacent to the cover plate;
a first protection layer disposed on the back surface of the display, wherein the first protection layer has an area less than an area of the back surface of the electronic-ink such that a sidewall of the first protection layer and the back surface of the display constitute a step structure;
a frame disposed on a peripheral area of the cover plate and surrounding the display such that a trench is formed between the frame and the display, wherein the frame has at least a first positioning part extending from an inner sidewall of the frame towards the trench, and the first positioning part is at a position over the step structure constituted by the back surface of the display and the sidewall of the first protection layer; and
a water-proof glue filling the trench and the step structure, and in contact with the frame.

12. The display device of claim 11, wherein the frame has at least a second positioning part extending toward an outside direction of the frame for assembling a peripheral component.

13. The display device of claim 11, wherein the cover plate has a curvature.

14. The display device of claim 11, wherein a material of the cover plate is glass, quartz, or plastic.

15. The display device of claim 11, further comprising a transparent glue disposed between the cover plate and the display.

16. The display device of claim 11, wherein the water-proof glue is contact with the first positioning part of the frame.

17. The display device of claim 16, further comprising a second protection layer disposed on the first protection layer, wherein the water-proof glue fills between the second protection layer and the frame.

18. The display device of claim 11, wherein the display comprises:
a first transparent substrate disposed on the cover plate;
a common electrode layer disposed on the first transparent substrate;
an electronic ink layer disposed on the common electrode layer;
a thin film transistor array layer disposed on the electronic ink layer; and
a second substrate disposed on the thin film transistor array layer.

19. The display device of claim 18, wherein the second substrate is a flexible substrate.

20. The display device of claim 11, wherein the display comprises:
a common electrode layer disposed on the cover plate;
an electronic ink layer disposed on the common electrode layer;
a thin film transistor array layer disposed on the electronic ink layer; and
a second substrate disposed on the thin film transistor array layer.

* * * * *